US011843100B2

(12) United States Patent
Lombardi et al.

(10) Patent No.: US 11,843,100 B2
(45) Date of Patent: Dec. 12, 2023

(54) SPACE-SAVING, SERVICEABLE MODULAR BATTERY ASSEMBLY FOR A USER EQUIPMENT

(71) Applicant: Google LLC, Mountain View, CA (US)

(72) Inventors: Michael J. Lombardi, South Barrington, IL (US); David K. Lim, Glenview, IL (US); Joseph L. Allore, Mundelein, IL (US); Bradley R. Zimmermann, Aurora, IL (US); Lukasz Kozlarzewski, Sunrise, FL (US)

(73) Assignee: Google LLC, Mountain View, CA (US)

( * ) Notice: Subject to any disclaimer, the term of this patent is extended or adjusted under 35 U.S.C. 154(b) by 498 days.

(21) Appl. No.: 17/006,618

(22) Filed: Aug. 28, 2020

(65) Prior Publication Data

US 2021/0296717 A1 Sep. 23, 2021

(51) Int. Cl.
*H01M 10/647* (2014.01)
*H04M 1/02* (2006.01)
*H01M 10/42* (2006.01)
*H01M 10/0525* (2010.01)

(52) U.S. Cl.
CPC ....... *H01M 10/647* (2015.04); *H01M 10/425* (2013.01); *H04M 1/0262* (2013.01); *H04M 1/0277* (2013.01); *H01M 10/0525* (2013.01); *H01M 2010/4271* (2013.01); *H01M 2010/4278* (2013.01)

(58) Field of Classification Search
CPC ............. H01M 10/647; H01M 10/425; H01M 10/0525; H01M 2010/4271; H01M 2010/4278; H04M 1/0262; H04M 1/0277
See application file for complete search history.

(56) References Cited

U.S. PATENT DOCUMENTS

| | | | |
|---|---|---|---|
| 7,510,791 B2 | 3/2009 | Moon et al. | |
| 8,623,542 B2 | 1/2014 | Baek et al. | |
| 2005/0156561 A1* | 7/2005 | Yu | H01M 10/46 320/107 |
| 2006/0057458 A1 | 3/2006 | O'Dea et al. | |
| 2012/0268879 A1* | 10/2012 | Kim | H05K 1/147 361/679.09 |
| 2013/0143103 A1 | 6/2013 | Huang et al. | |
| 2016/0028128 A1* | 1/2016 | Limvorapun | H01M 10/615 429/61 |

FOREIGN PATENT DOCUMENTS

| | | |
|---|---|---|
| CN | 104821973 | 8/2015 |
| EP | 1955391 | 8/2008 |

* cited by examiner

*Primary Examiner* — James Lee
(74) *Attorney, Agent, or Firm* — Colby Nipper PLLC

(57) ABSTRACT

The present disclosure describes one or more aspects of a space-saving, serviceable modular battery assembly that may be used as part of a user equipment. The space-saving, serviceable modular battery assembly includes a battery cell electrically coupled to a first module assembly that monitors a state of the battery cell, a first alignment bracket located at a first end of the battery cell, and a second alignment bracket located at a second end of the battery cell. The first module assembly overlaps a second module assembly that supports system-level functions of the user equipment.

22 Claims, 4 Drawing Sheets

SPACE-SAVING, SERVICEABLE MODULAR BATTERY ASSEMBLY FOR A USER EQUIPMENT

BACKGROUND

Increasing the capacity of a battery for a user equipment (UE), such as a smartphone, is typically a feature that is highly-desired by consumers. To address battery-reliability and/or UE performance concerns, consumers may also desire to have the ability to service their UE. Servicing the UE may include, for instance, replacing the battery, reworking a printed circuit board (PCB) assembly that may be located proximate to the battery, replacing a connector, and so on.

Typical strategies for integrating the battery into the UE fail to address these desired features. As an example, integrating the battery into the UE may often include epoxying the battery to an interior surface of a housing of the UE, which may inhibit UE servicing. As another example, increasing the physical size of the battery to increase the capacity of the battery often drives an increase in the physical size of the UE, which, in turn, may deter consumers from purchasing the UE.

SUMMARY

This Summary is provided to introduce subject matter that is further described in the Detailed Description and Drawings. Accordingly, this Summary should not be considered to describe essential features nor used to limit the scope of the claimed subject matter.

In some aspects, a UE is described. The UE includes a battery cell having a generally cuboid shape, a top defining a first generally planar region, and an end defining a second generally planar region. The second generally planar region is substantially orthogonal to the first generally planar region. The UE also includes a first module assembly that is electrically coupled to the battery cell and extends outwardly from the second generally planar region of the end of the battery cell. The first module assembly includes first integrated circuit components that monitor a state of the battery cell and a first printed circuit board having a first surface that defines a third generally planar region that is adjacent to the end of the battery cell. The third generally planar region is substantially orthogonal to the second generally planar region and substantially parallel to the first generally planar region.

The UE also includes a second module assembly that extends outwardly from the end of the battery cell proximate to the first module assembly. The second module assembly includes second integrated circuit components that support system-level functions of the UE and a second printed circuit board having a second surface defining a fourth generally planar region. The fourth generally planar region is adjacent to the end of the battery cell, substantially orthogonal to the second generally planar region, and substantially parallel to the third generally planar region. The second surface faces the first surface of the first printed circuit board, is separated from the first surface of the first printed circuit board by a gap, and is overlapped by at least a portion of the first surface of the first printed circuit board.

In some other aspects, battery module assembly is described. The battery module assembly includes a battery cell having a generally cuboid shape. The battery cell has first and second opposing ends intersected by a longitudinal axis, a generally planar surface having a perimeter outline that is substantially symmetric about the longitudinal axis, and a fixture assembly for temporarily fixing the battery cell within a user equipment. The fixture assembly includes a first alignment bracket that is bonded to a first portion of the generally planar surface that is located proximate to the first end of the battery cell. The first alignment bracket also includes one or more first flanges that extend beyond the perimeter outline of the generally planar surface. At least one of the first flanges defines an alignment hole that is centered beyond the perimeter outline of the generally planar surface.

The fixture assembly also includes a second alignment bracket bonded to a second portion of the generally planar surface that is located proximate to the second end of the battery cell that is opposite the first end of the battery cell. The second alignment bracket includes one or more second flanges that extend beyond the perimeter outline of the generally planar surface. At least one of the second flanges defines an alignment hole that is centered beyond the perimeter outline of the generally planar surface.

The details of one or more implementations of a space-saving, serviceable modular battery assembly for a UE are set forth in the accompanying drawings and the following description. Other features and advantages will be apparent from the description, drawings, and claims. This Summary is provided to introduce subject matter that is further described in the Detailed Description and Drawings. Accordingly, a reader should not consider the Summary to describe essential features nor limit the scope of the claimed subject matter.

BRIEF DESCRIPTION OF THE DRAWINGS

This document describes details of one or more aspects of a space-saving, serviceable modular battery assembly that may be used in a UE. The use of the same reference numbers in other instances in the description and the figures may indicate like elements.

DETAILED DESCRIPTION

The present disclosure describes one or more aspects of a space-saving, serviceable modular battery assembly that may be used as part of a UE. The space-saving, serviceable modular battery assembly includes a battery cell electrically coupled to a first module assembly that monitors a state of the battery cell, a first alignment bracket located at a first end of the battery cell, and a second alignment bracket located at a second end of the battery cell. The first module assembly overlaps a second module assembly that supports system-level functions of the user equipment.

Typical designs of a UE may exacerbate battery cell sizing challenges. As an example, the design may call for different modules having different PCBs, such as a battery module assembly that is electrically coupled to the battery cell and a system module assembly, to share a same plane. In doing so, respective PCBs of the battery module assembly and the system module assembly are positioned adjacent to one another, consuming valuable space available within the UE housing.

As an alternative, and as described in greater detail below, arranging the battery module assembly and system module assembly in an overlapping (e.g., "stacked") fashion may allow a battery cell size to increase without consuming additional space within the UE housing. This can, in some instances, translate into improving the charge-life of the battery cell approximately 5% to 15% (e.g., a UE having a "side-by-side" battery module assembly/system module assembly design may accommodate a battery cell that has a charge-life of approximately 10 hours, while a UE using the overlapping battery module assembly/system module assembly design may occupy less space and accommodate a larger battery cell that has a charge-life of 10½ hours to 11½ hours).

Typical designs of the UE may also use techniques that permanently fix the battery cell within the UE. Such techniques may include epoxying the battery cell to an interior surface of a housing of the UE, resulting in increased difficulty of servicing the UE in an instance where the battery cell might need to be removed (e.g., repair or replace the battery cell, repair or replace a module assembly).

The first alignment bracket, the second alignment bracket, and the stacking of the PCB assemblies as described herein may alleviate the above-mentioned drawbacks of typical UE designs. While features and concepts of the space-saving, serviceable modular battery assembly can be implemented in any number of different environments and devices, aspects are described in the context of an example operating environment and example apparatus details below.

Example Operating Environment

Figure 1:
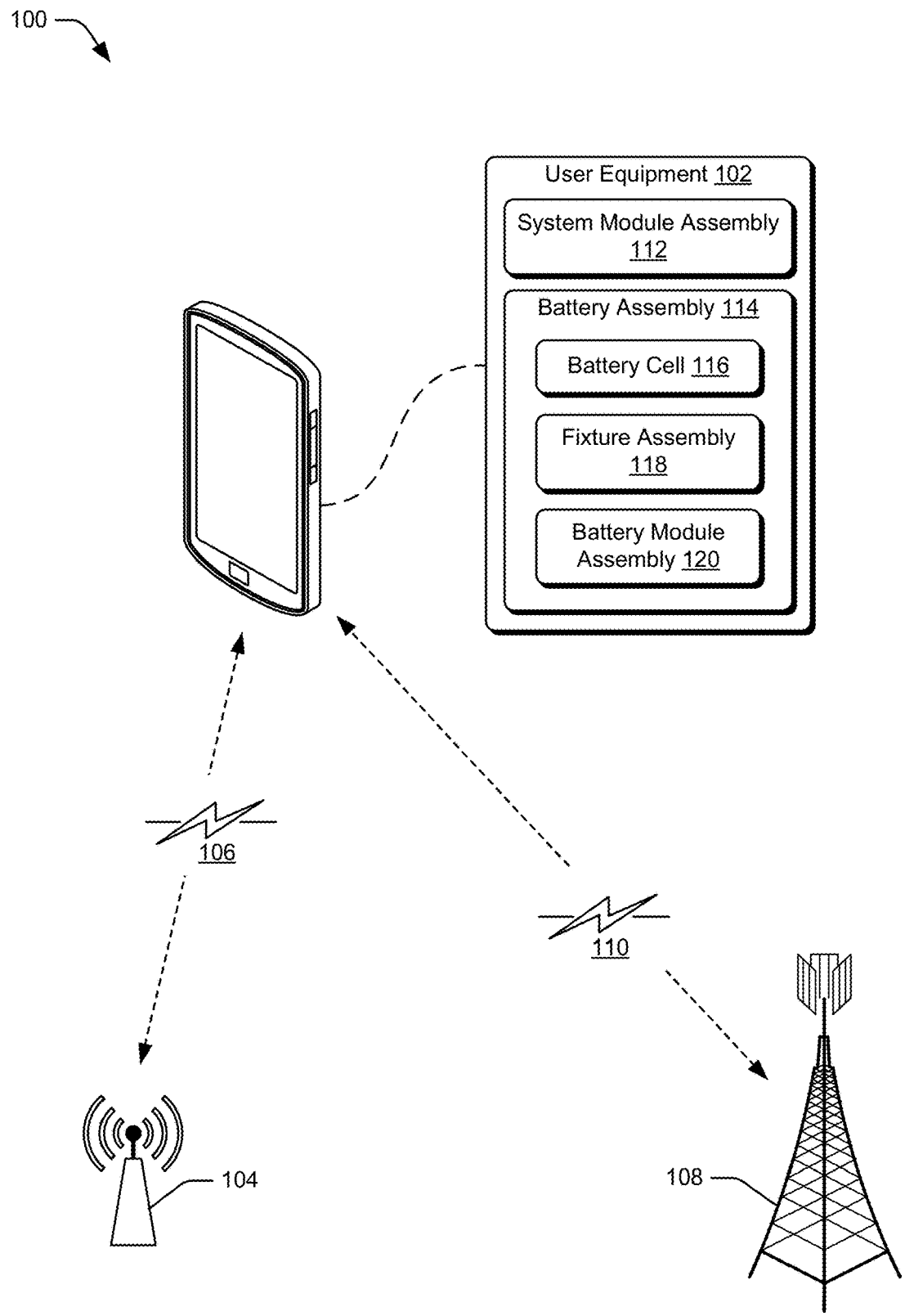
FIG. 1 illustrates an example operating environment in which various aspects of a space-saving, modular battery assembly are implemented.

FIG. 1 illustrates an example operating environment 100 in which various aspects of a space-saving, modular battery assembly are implemented. In the operating environment 100, a UE 102 may wirelessly communicate with one or more wireless networks, connecting to one or more respective access points supporting the one or more wireless networks using wireless links.

As illustrated in FIG. 1, the UE 102 may wirelessly connect to a router 104 using a wireless link 106. The wireless link 106 may adhere to an IEEE 802.11 protocol used to support wireless communications of a local area network (LAN). As further illustrated in FIG. 1, the UE 102 may wirelessly connect to a base station 108 using another wireless link 110. The other wireless link 110 may adhere to a 3rd Generation Partnership Project Long-Term Evolution (3GPP LTE) or Fifth Generation New Radio (5G NR) protocol used to support wireless communications of a cellular network.

To support system-level functions of the UE 102, including wireless communications, the UE 102 includes a system module assembly 112. The system module assembly 112 may include a printed circuit board (PCB) that is populated with one or more integrated circuit (IC) components such as a processor IC component, a transceiver IC component, a memory IC component, and so on. In general, a type of IC component that might be populated onto the PCB of the system module assembly 112 may vary depending upon desired system-level functions of the UE 102.

To support operations of the UE 102, including those performed by the system module assembly 112, the UE 102 includes a battery assembly 114. The battery assembly 114 includes a battery cell 116, fixture assembly 118, and a battery module assembly 120. In some instances, the battery cell 116 may be rechargeable and formed from a sealed pouch containing lithium-ion electrolytes (e.g., one or more seals may be folded along sides or ends of a pouch containing lithium-ion electrolytes). The battery cell 116 may be fixed to a location within the UE 102 using the fixture assembly 118. The fixture assembly 118 may include flanges that extend beyond a perimeter of a surface of the battery cell 116. Furthermore, each of the flanges may have an alignment hole or slot that can be used in conjunction with an alignment pin or a fixturing mechanism (e.g., a screw, a rivet).

The UE 102 also includes a battery module assembly 120, sometimes referred to as a protection circuit module (PCM). The battery module assembly 120 may include a PCB that is populated with one or more IC components that monitor a state of the battery cell 116. As examples, the one or more IC components of the battery module assembly 120 may monitor a temperature of the battery cell 116, a current draw (e.g., milli-amperes) of the battery cell 116, an electric potential of the battery cell 116 (e.g., volts), and so on. The battery module assembly 120 may electrically couple to the battery cell 116.

Although illustrated as a smartphone, the UE 102 may be any one of multiple types of devices. Other example types of devices include a personal digital assistant (PDA), a tablet, a laptop computer, a handheld gaming device, and so on. Furthermore, and although aspects of the UE 102 are described in terms of wireless communications, the UE 102 may perform additional functions and include hardware such as a display, audio speakers, a graphical user interface (GUI), and so on.

Example Apparatus Details

Figure 2:
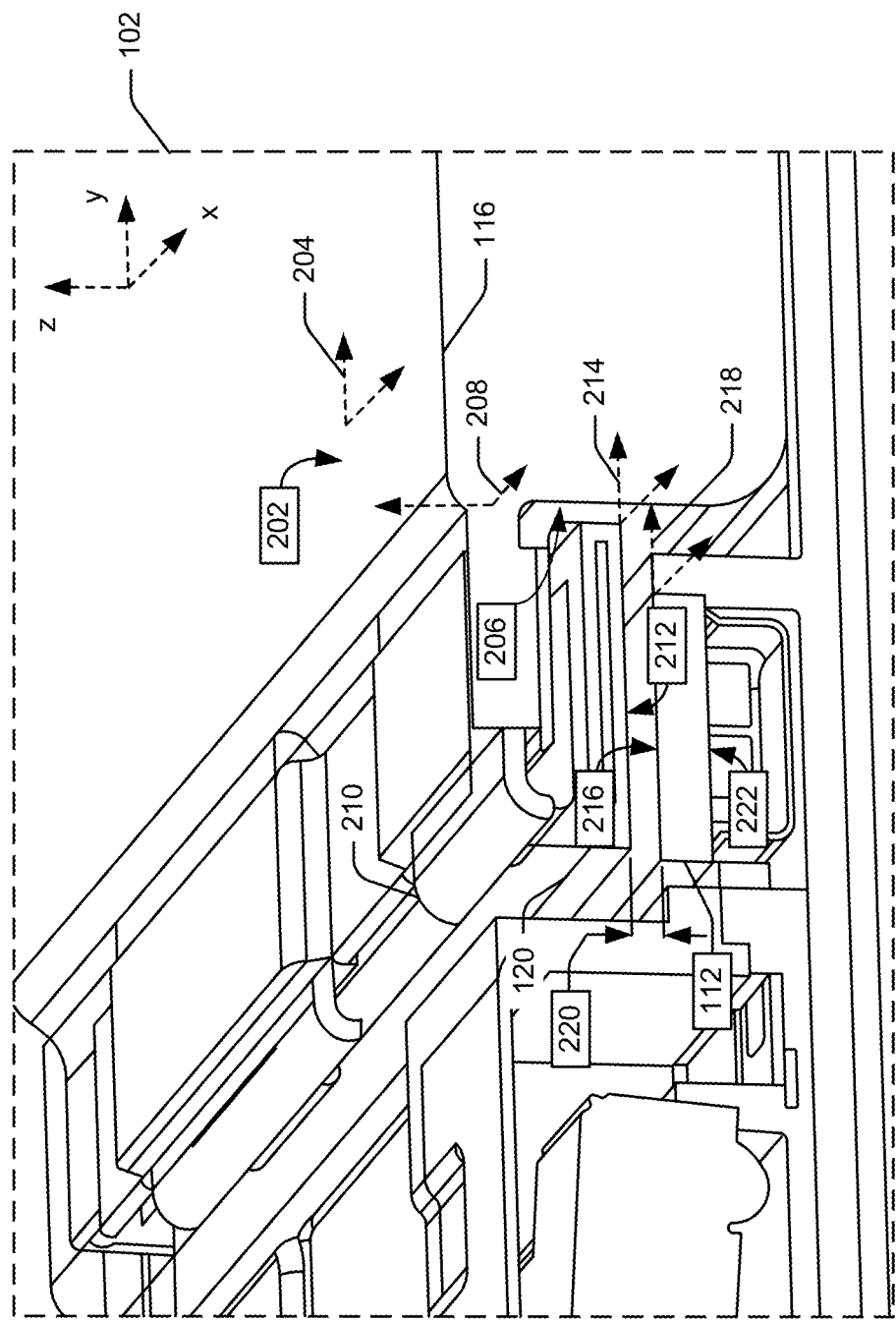
FIG. 2 illustrates an isometric, cutaway view of a UE having a space-saving, serviceable modular battery assembly.

FIG. 2 illustrates an isometric, cutaway view 200 of a UE having a space-saving, serviceable modular battery assembly. In some instances, the UE may be the UE 102 of FIG. 1, including the system module assembly 112, the battery cell 116, and the battery module assembly 120.

As illustrated by FIG. 2, the battery cell 116 has a generally cuboid shape. The battery cell 116 also has a top 202 defining a first generally planar region 204 (illustrated as dashed arrows in an xy plane) and an end 206 defining a second generally planar region 208. The second generally planar region 208 (illustrated as dashed arrows in an xz plane) is substantially orthogonal to the first generally planar region 204.

In the description of FIG. 2, the term "top" is not specific to a particular orientation of the battery cell 116 and is not necessarily defined relative to gravity/ground, but is used to describe a surface corresponding to the illustrated example. In some instances, the term "top" may refer to a bottom side of the battery cell 116 if the battery cell 116 is flipped relative to the illustration.

The battery module assembly 120 extends outwardly from the second generally planar region 208 of the end 206 of the battery cell 116. The battery module assembly 120 may include a single-layer PCB (e.g., a PCB including a single layer of conductive traces) or a multi-layer PCB (e.g., a PCB including multiple layers of conductive traces). The battery module assembly 120 electrically couples to terminals 210 (e.g., tabs or electrodes) that may be part of the battery cell 116).

The battery module assembly 120 may also include one or more IC components (not visible in FIG. 2) that monitor states of the battery cell 116. Examples include an over-voltage state, an under-voltage state, an over-current state, an over-temperature state, or an under-temperature state. In some instances, the one or more IC components of the battery module assembly 120 may protect the battery cell 116 by shutting down the battery cell 116 or altering performance of the battery cell 116 (e.g., reduce electrical current draw from the battery cell 116) when one or more state thresholds are violated.

The battery module assembly 120 includes a surface 212 (e.g., a surface of the PCB of the battery module assembly 120) that defines a third generally planar region 214. The third generally planar region 214 (illustrated by arrows in the xy plane) is located adjacent to the end of the battery cell 116, is substantially orthogonal to the second generally planar region 208, and is substantially parallel to the first generally planar region 204. To maintain a low profile, the battery module assembly 120 (including the IC components that may be mounted to the battery module assembly 120) may have a thickness that is less than that of the battery cell 116 (e.g., the battery module assembly 120 may be approximately two-thirds a thickness of the battery cell 116).

The UE 102 includes another module assembly (e.g., the system module assembly 112) extending outwardly from the end of the battery cell 160. The system module assembly 112 may include a single layer PCB (e.g., a PCB including a single layer of conductive traces) or a multi-layer PCB (e.g., a PCB including multiple layers of conductive traces).

The system module assembly 112 includes a surface 216 (e.g., a surface of the PCB of the system module assembly 112) that defines a fourth generally planar region 218 (illustrated by arrows in the xy plane). The fourth generally planar region 218 is located adjacent to the end 206 of the battery cell 116, is substantially orthogonal to the second generally planar region 208 and is substantially parallel to the third generally planar region 214.

The surface 216 of the system module assembly 112 may face the surface 212 of the battery module assembly 120. The surface 216 and the surface 212 may be separated by a gap 220. Furthermore, the surface 216 may be overlapped by at least a portion of the surface 212 (e.g., the battery module assembly 120 may be "stacked" over the system module assembly 112).

The system module assembly 112 includes one or more IC components that support system-level functions (e.g., wireless communications) of the UE 102. For example, the one or more IC components of the system module assembly 112 may include a processor IC component, a transceiver IC component, a memory IC component, and so on. Placement of IC components on PCBs of the system module assembly 112 and the battery module assembly 120 (e.g., using surface-mount techniques to solder interconnects of an IC component to pads of the PCBs) may be dependent on layouts of the PCBs.

In some instances, and to reduce a dimension of the gap 220, one or more portions of the surface 216 and/or the surface 212 may be bare (e.g., void of IC components). As an example, the surface 216 of the system module assembly 112 may be bare while an opposite surface (e.g., surface 222) may be populated with the one or more IC components that support system-level operations of the UE 102. In a complementary fashion, portions of the surface 212 that overlap the surface 216 may be bare, while the IC components that monitor the state of the battery cell 116 may be populated onto another surface of the battery module assembly 120 (e.g., another surface of the PCB of the battery module assembly 120 that is opposite the surface 212) or onto portions of the surface 212 that do not overlap the surface 216.

As another example, the surface 212 of the battery module assembly 120 may be bare, and a portion of the surface 216 that is overlapped by the surface 212 may be bare while another portion of the surface 216 that is not overlapped by the surface 212 is populated with one or more IC components. In general, different portions of different surfaces may be bare (e.g., void of IC components) to reduce the dimension of the gap 220.

Figure 3:
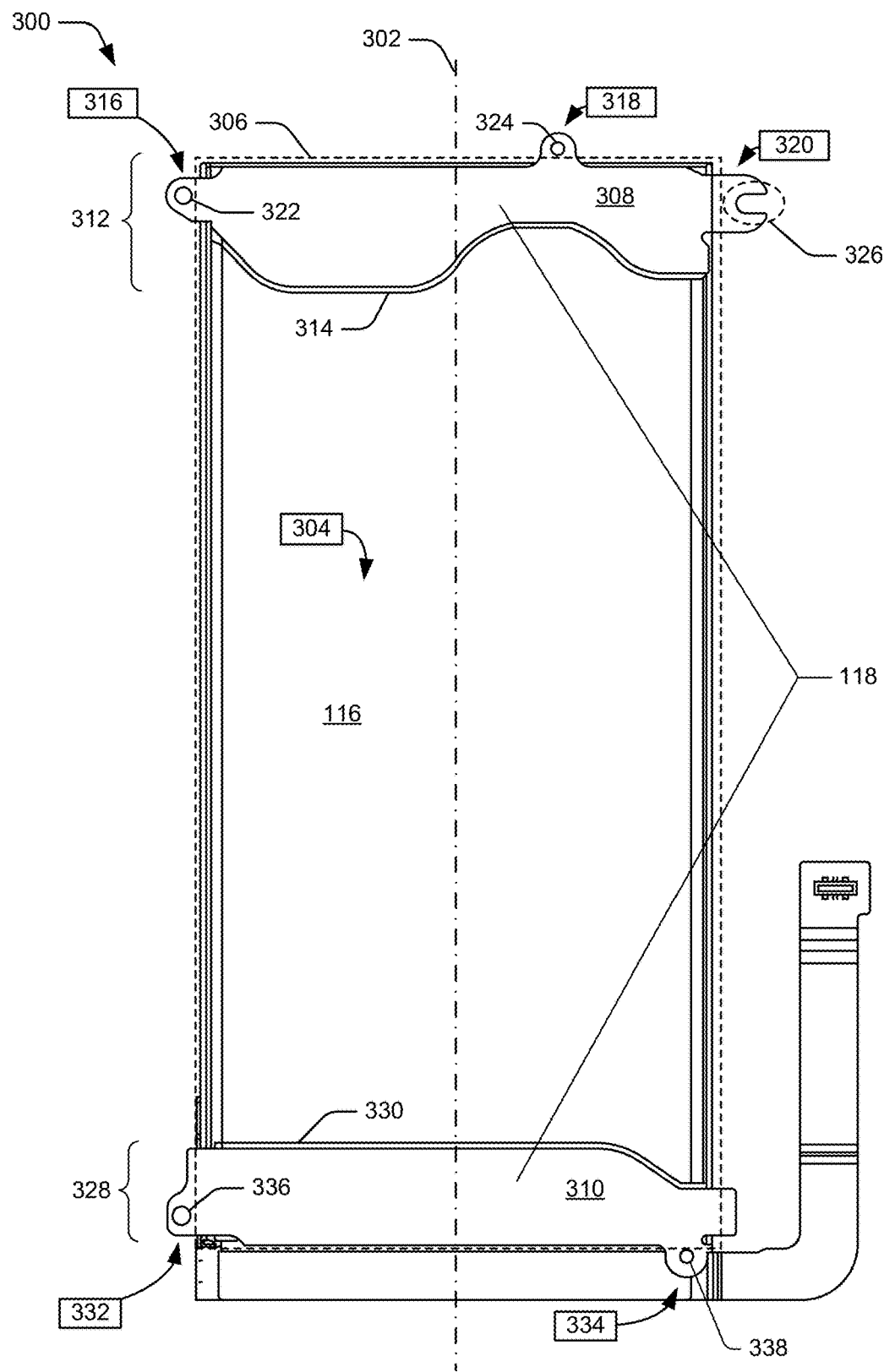
FIG. 3 illustrates example details of a fixture assembly that may be used as part of a space-saving, serviceable modular battery assembly.

FIG. 3 illustrates example details 300 of a fixture assembly that may be used as part of a space-saving, serviceable modular battery assembly. In some instances, the fixture assembly may be the fixture assembly 118 of FIG. 1.

FIG. 3 illustrates a top view of a battery cell (e.g., the battery cell 116 from FIGS. 1 and 2) that has a cuboid shape and is generally symmetrical about a longitudinal axis 302. The battery cell 116 has opposing ends that are intersected by the longitudinal axis 302. As further illustrated, the battery cell 116 has a generally planar surface 304 that is generally rectangular in shape (e.g., having two opposing sides, which are generally parallel to the longitudinal axis, and two additional opposing sides, which are generally perpendicular to the longitudinal axis). Although illustrated as rectangular in shape, in some instances the generally planar surface 304 may be generally square in shape. The generally planar surface 304 has a perimeter outline 306 that may be generally symmetrical about the longitudinal axis 302.

The battery cell 116 also includes the fixture assembly 118 for temporarily fixing the battery cell 116 within a UE (e.g., the UE 102 as illustrated in FIG. 1). The fixture assembly 118 includes a first alignment bracket 308 and a second alignment bracket 310 that are located at opposing first and second ends of the battery cell 116 that are intersected by the longitudinal axis 302. In some instances, the first alignment bracket 308 and/or the second alignment bracket 310 may be formed from a stamped metal material (e.g., a stamped stainless-steel metal material, a stamped aluminum metal material).

The first alignment bracket 308 is bonded to a portion 312 of the generally planar surface 304, where the portion 312 is located proximate to the first end of the battery cell 116. In some instances, a first adhesive 314 (e.g., an epoxy) may bond the first alignment bracket 308 to the portion 312 of the generally planar surface 304. Furthermore, and in some instances, the first adhesive 314 may extend uniformly from one or more edges of the first alignment bracket 308 along the generally planar surface 304. The uniform extension of the first adhesive 314 from the one or more edges of the first alignment bracket 308 may, in some instances, reduce wrinkling of a material, forming a shell of the battery cell 116 (e.g., a material forming a pouch).

The first alignment bracket 308 includes flanges 316, 318, and 320 that extend beyond the perimeter outline 306. In some instances, one or more of the flanges may extend in a direction that is substantially orthogonal the longitudinal axis 302 (e.g., as illustrated, the flange 316 and the flange 320 extend beyond the perimeter outline 306 in directions that are substantially orthogonal to the longitudinal axis 302). In some other instances, one or more of the flanges may extend in a direction that is substantially parallel to the longitudinal axis (e.g., as illustrated, the flange 318 extends beyond the perimeter outline 306 in a direction that is substantially parallel to the longitudinal axis 302).

One or more of the flanges (e.g., the flange 316 and/or the flange 318) may define an alignment hole (e.g., alignment hole 322 and/or alignment hole 324, respectively) that is centered outside of the perimeter outline 306. Another flange (e.g., the flange 320) may include a slot 326 that is located outside of the perimeter outline 306.

The second alignment bracket 310 is bonded to a portion 328 of the generally planar surface 304 that is located proximate to the second end of the battery cell 116 that is opposite the first end of the battery cell 116. In some instances, a second adhesive 330 (e.g., an epoxy) may bond the second alignment bracket 310 to the portion 328 of the generally planar surface 304. Furthermore, and in some instances, the second adhesive 330 may extend uniformly from one or more edges of the second alignment bracket 310 along the generally planar surface 304. The uniform extending of the second adhesive 330 from the one or more edges of the second alignment bracket 310 may, in some instances, reduce wrinkling of a material forming a shell of the battery cell 116 (e.g., the material forming the pouch).

The second alignment bracket 310 may include one or more flanges (e.g., flange 332 and flange 334) that extend beyond the perimeter outline 306. In some instances, one or more of the flanges may extend in a direction that is substantially orthogonal to the longitudinal axis 302 (e.g., the flange 332 extends beyond the perimeter outline 306 in a direction that is substantially orthogonal to the longitudinal axis 302). In some other instances, one or more of the flanges may extend in a direction that is substantially parallel to the longitudinal axis 302 (e.g., the flange 334 extends beyond the perimeter outline 306 in a direction that is substantially parallel to the longitudinal axis 302).

One or more of the flanges (e.g., the flange 332 and the flange 334) may include a respective alignment hole (e.g., alignment hole 336 and/or alignment hole 338, respectively). The respective alignment hole is centered outside of the perimeter outline 306.

Figure 4:
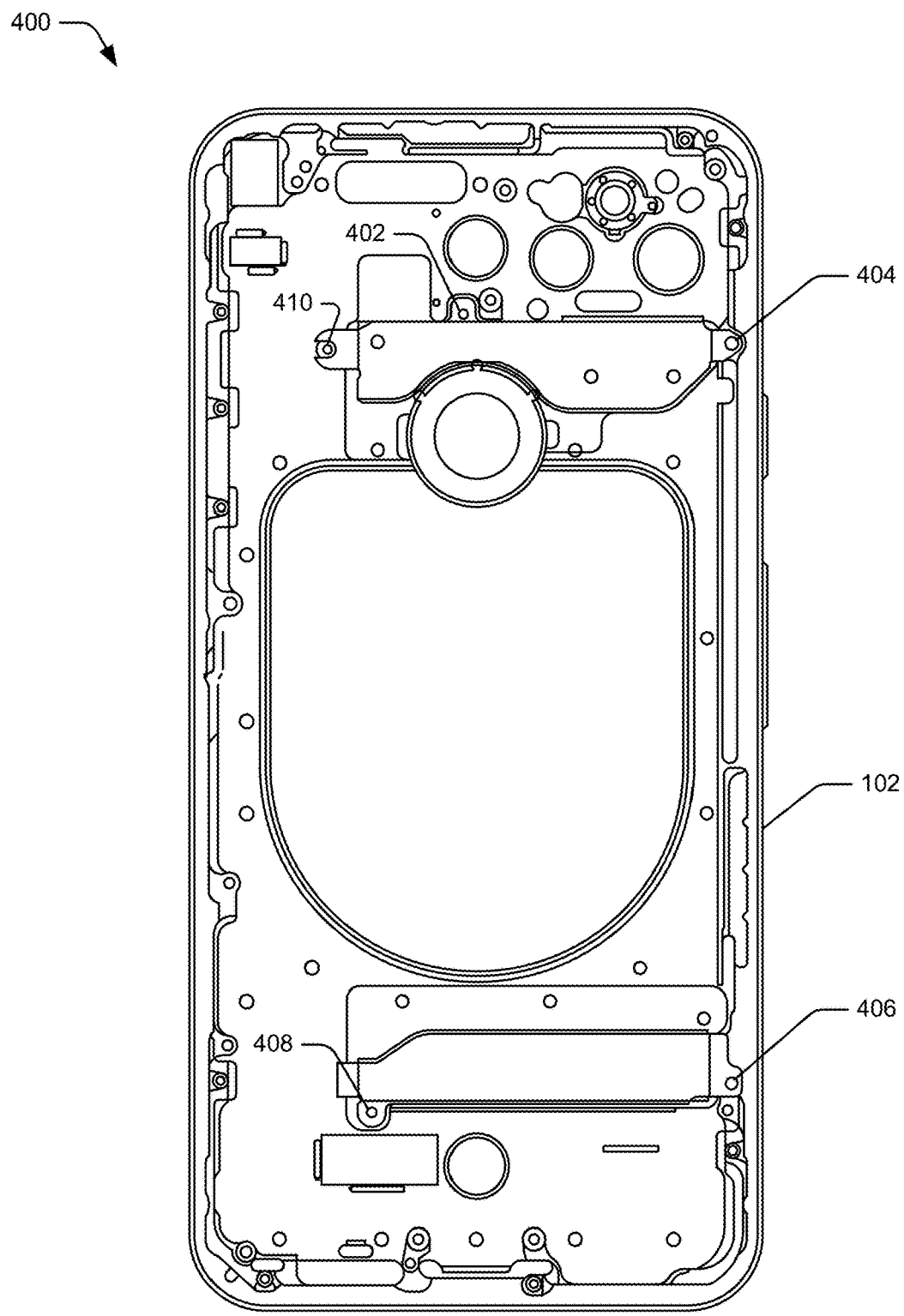
FIG. 4 illustrates example details of alignment pins and/or screw holes that may be used as part of a space-saving, serviceable modular battery assembly.

FIG. 4 illustrates example details 400 of alignment pins and/or screw holes that may be used as part of a space-saving, serviceable modular battery assembly. The alignment pins and/or screw holes may be included in interior structures of a UE, such as the UE 102 of FIG. 1. Furthermore, and in general, the alignment pins and/or screw holes may be used to capture a battery cell (e.g., the battery cell 116 as illustrated in FIGS. 1-3) within the UE 102.

FIG. 4 illustrates multiple example alignment pins 402, 404, 406, and 408 that may be press-fit into interior structures of the UE 102 (e.g., press-fit into an interior surface of a housing the UE 102, another structure within the UE 102 such as another PCB of the UE 102). The alignment pins 402-408, in general, may be positioned to complement alignment holes (e.g., the alignment holes 322, 324, 336, and 338 of FIG. 3) that may be part of a fixture assembly (e.g., the fixture assembly 118).

FIG. 4 also illustrates a threaded hole 410. The threaded hole 410, in general, may be positioned to align with a slot of the fixture assembly (e.g., the slot 326 of FIG. 3). The threaded hole 410 may receive a screw, which can be used to temporarily fix a battery assembly (e.g., the battery assembly 114 including the battery cell 116 and the fixture assembly 118 as referenced in FIG. 1) in place. In general, the combination of the alignment pins 402-408 and the threaded hole 410, as illustrated, is but one of many possible combinations of alignment pins and/or threaded holes that may be used to fix the battery assembly in place.

In general, the space-saving, serviceable modular battery assembly alleviates UE space challenges while affording a battery having a larger size and with an extended charge-life. Furthermore, the space-saving, serviceable modular battery assembly enables rework of components of a UE, including a battery cell and one or more PCB assemblies.

Although techniques using a space-saving, serviceable modular battery assembly that may be used as part of a user equipment are described herein, it is to be understood that the subject of the appended claims is not necessarily limited to the specific features or methods described. Rather, the specific features and methods are disclosed as example ways in which a space-saving, serviceable modular battery assembly can be implemented.

What is claimed is:

1. A user equipment comprising:
a modular battery assembly comprising:
a battery cell having a generally cuboid shape, the battery cell having a top defining a first generally planar region and an end defining a second generally planar region, the second generally planar region substantially orthogonal to the first generally planar region and a longitudinal axis of the battery cell; and
a first printed circuit board assembly (PCBA) extending outwardly from the second generally planar region of the end of the battery cell, the first PCBA electrically coupled to the battery cell and including:
first integrated circuit components that monitor a state of the battery cell;
a first printed circuit board including a first surface, the first surface defining a third generally planar region that is adjacent to the end of the battery cell, substantially orthogonal to the second generally planar region, and substantially parallel to the first generally planar region; and
a fixture assembly attached to the battery cell via an adhesive, the fixture assembly comprising a flange that extends beyond a perimeter of the battery cell parallel to the first generally planar region, the flange including a hole or a slot that is located outside of the perimeter of the battery cell;
a housing configured to receive the modular battery assembly, the housing having an interior structure comprising a pin or a threaded hole configured to align or attach the modular battery assembly to the housing based on the hole or the slot of the fixture assembly;
a second (PCBA) positioned within the housing, extending toward the end of the battery cell, and disposed proximate to the first PCBA, the second PCBA including:
second integrated circuit components that support system-level functions of the user equipment; and
a second printed circuit board having a second surface defining a fourth generally planar region that is adjacent to the end of the battery cell, substantially orthogonal to the second generally planar region, and substantially parallel to the third generally planar region,
the second surface facing the first surface of the first printed circuit board, separated from the first surface of the first printed circuit board by a gap, and overlapped by a first portion of the first surface of the first printed circuit board that does not include the first integrated circuit components, a second portion of the second surface of the second printed circuit board that is overlapped by the first portion of the first surface of the first printed circuit board not including the second integrated circuit components such that the first portion of the first printed circuit board of the modular battery assembly is positioned adjacent to the second portion of the second printed circuit board of the user equipment without the first integrated circuit components and the second integrated circuit components being located in the gap between the first printed circuit board and the second printed circuit board.

2. The user equipment as recited in claim 1, wherein the battery cell is rechargeable and formed from a sealed pouch containing lithium-ion electrolytes.

3. The user equipment as recited in claim 2, wherein the battery cell includes one or more seals that are folded along one or more sides of the sealed pouch.

4. The user equipment as recited in claim 1, wherein the generally cuboid shape of the battery cell includes a generally planar surface that is rectangular in shape.

5. The user equipment as recited in claim 1, wherein the first printed circuit board is a multi-layer printed circuit board.

6. The user equipment as recited in claim 1, wherein the first printed circuit board is electrically coupled to terminals of the battery cell.

7. The user equipment as recited in claim 1, wherein the first integrated circuit components that monitor the state of the battery cell monitor an over-voltage state, an under-voltage state, an over-current state, an over-temperature state, or an under-temperature state.

8. The user equipment as recited in claim 7, wherein the first integrated circuit components are configured to alter a performance of the battery cell if a state threshold is violated.

9. The user equipment as recited in claim 8, wherein the first surface of the first printed circuit board is bare, and the first integrated circuit components are mounted to another surface of the first printed circuit board that is opposite the first surface.

10. The user equipment as recited in claim 1, wherein the second integrated circuit components include a processor integrated circuit component, a memory integrated circuit component, or a transceiver integrated circuit component.

11. The user equipment as recited in claim 10, wherein the second portion of the second surface of the second printed circuit board is bare and the second integrated circuit components are:
    mounted to either another surface of the second printed circuit board that is opposite the second surface; or
    mounted to a third portion of the second surface that does not overlap with the first portion of the first surface of the first printed circuit board.

12. The user equipment as recited in claim 1, wherein the battery cell is temporarily fixed to the interior structure of the user equipment using the hole or the slot of the flange of the fixture assembly.

13. The user equipment as recited in claim 12, wherein the hole or the slot of the flange:
    captures the pin of the interior structure of the user equipment; or
    is captured by a screw coupled with the threaded hole of the interior structure of the interior structure of the user equipment.

14. The user equipment as recited in claim 1, wherein the flange is a first flange, the hole is a first hole, the slot is a first slot, the end of the battery cell is a first end of the battery cell, and the fixture assembly comprises:

a first alignment bracket bonded to a first portion of the first generally planar region, the first portion of the first generally planar region located proximate to the first end of the battery cell, the first alignment bracket comprising one or more first flanges that include the first flange; and
a second alignment bracket bonded to a second portion of the first generally planar region, the second portion of the first generally planar region located proximate to a second end of the battery cell opposite the first end of the battery cell, the second alignment bracket comprising one or more second flanges that include a second flange that extends beyond the perimeter of the battery cell, the second flange including a second hole or second slot that is located outside of the perimeter of the battery cell.

15. The user equipment as recited in claim 14, wherein the pin is a first pin, the threaded hole is a first threaded hole, the interior structure of the user equipment further comprises a second pin or a second threaded hole, and the battery cell is temporarily fixed to the interior structure of the user equipment using the second hole or the second slot of the second flange of the second alignment bracket.

16. The user equipment as recited in claim 15, wherein the second hole or the second slot of the second flange:
    captures second the pin of the interior structure of the user equipment; or
    is captured by another screw coupled with the second threaded hole of the interior structure of the interior structure of the user equipment.

17. The user equipment as recited in claim 14, wherein the adhesive is a first adhesive, and
    the first alignment bracket is bonded to the first portion of the first generally planar region using the first adhesive; or
    the second alignment bracket is bonded to the second portion of the first generally planar region using a second adhesive.

18. The user equipment as recited in claim 17, wherein:
    the first adhesive is an epoxy that extends uniformly from one or more edges of the first alignment bracket along the first generally planar region; or
    the second adhesive is another epoxy that extends uniformly from one or more edges of the second alignment bracket along the first generally planar region.

19. The user equipment as recited in claim 14, wherein the first alignment bracket or the second alignment bracket is formed from a stamped metal material.

20. The user equipment as recited in claim 14, wherein at least one of the one or more first flanges extends in a first direction that is substantially orthogonal to the longitudinal axis and outward from the first generally planar region.

21. The user equipment as recited in claim 20, wherein at least one of the one or more first flanges extends in a second direction that is substantially parallel to the longitudinal axis.

22. The user equipment as recited in claim 21, wherein at least one of the one or more second flanges extends in a third direction that is substantially orthogonal to the longitudinal axis and opposite the first direction.

* * * * *